United States Patent [19]
Jasinski et al.

[11] Patent Number: 5,110,387
[45] Date of Patent: May 5, 1992

[54] METHOD FOR LAMINATING POLYMER FILMS

[75] Inventors: John F. Jasinski, New Freedom; Robert P. McCormick; Ricky C. Mellinger, both of Seven Valleys, all of Pa.; James K. Draper; Navin N. Vyas, both of Winston Salem, N.C.

[73] Assignee: AMP Incorporated, Harrisburg, Pa.

[21] Appl. No.: 657,295

[22] Filed: Feb. 19, 1991

Related U.S. Application Data

[63] Continuation of Ser. No. 401,578, Aug. 24, 1989, abandoned, which is a continuation of Ser. No. 226,179, Jul. 29, 1988, abandoned.

[51] Int. Cl.⁵ .................... B32B 31/00; B65C 9/25
[52] U.S. Cl. .................... 156/222; 156/272.6; 156/273.3; 156/309.9; 156/321; 156/322; 156/324; 156/332; 174/94 C
[58] Field of Search .................... 174/84 C; 156/272.6, 156/272.2, 273.3, 309.9, 322, 324, 332, 222, 224, 49–52, 321

[56] References Cited

U.S. PATENT DOCUMENTS

| | | | |
|---|---|---|---|
| 3,188,265 | 6/1965 | Charbonneau | 428/483 X |
| 3,320,354 | 5/1987 | Marley et al. | 174/84 C |
| 3,328,872 | 1/1966 | Reem et al. | 29/566.4 |
| 3,360,412 | 12/1967 | James | 156/272.6 X |
| 3,410,950 | 11/1968 | Freudenberg | 174/84 C |
| 3,611,262 | 10/1971 | Marley et al. | 174/84 C |
| 3,823,061 | 7/1974 | Frayer et al. | 156/272.3 X |
| 4,008,352 | 2/1977 | Dawes et al. | 156/272.6 X |
| 4,313,996 | 2/1982 | Newman et al. | 156/244.27 |
| 4,464,541 | 8/1984 | Ceresa et al. | 174/84 C |
| 4,597,818 | 7/1986 | Aoyama et al. | 156/324 X |
| 4,765,860 | 8/1988 | Ueno et al. | 156/272.6 |
| 4,822,451 | 4/1989 | Ouderkirk | 156/272.6 |
| 4,939,008 | 7/1950 | Kemski | 428/34.3 |

OTHER PUBLICATIONS

Collins, W. M., "Surface Treatment", *Web Processing and Converting Technology and Equipment*, 1984, p. 246.

Primary Examiner—David A. Simmons
Assistant Examiner—Chester T. Barry
Attorney, Agent, or Firm—Katherine A. Nelson

[57] ABSTRACT

The present invention discloses a method for laminating at least two polymer films. An intermediate assembly 40 is made comprising an adhesive film 20 and a dielectric polymer film 12. The method comprises the steps of: selecting an adhesive film 20 with a melting point $T_1$, the adhesive film having inner and outer major surfaces 22, 24; selecting a polymer film 12, with a melting point $T_2$, where $T_2 > T_1$, the polymer film having inner and outer major surfaces 14, 16; subjecting the inner surface 14 of the polymer film 12 to a high voltage electric discharge to form a treated inner surface; heating the polymer film 12 having the treated inner surface to a temperature greater than $T_1$; aligning the inner adhesive surface 22 and the inner treated polymer surface 14 in opposed facing relationship; applying pressure to urge the films 12, 20 relatively together; and heating the pressed together films to a temperature greater than $T_1$; whereby the adhesive film 20 adheres to the polymer film 12 to form the intermediate laminated assembly 40. The intermediate assembly 40 is bondable to another substrate 28 to form a resultant laminated assembly 42, which may be formed into an article such as connector 44 wherein the intermediate laminate 40 remains assuredly bonded to substrate 28.

12 Claims, 3 Drawing Sheets

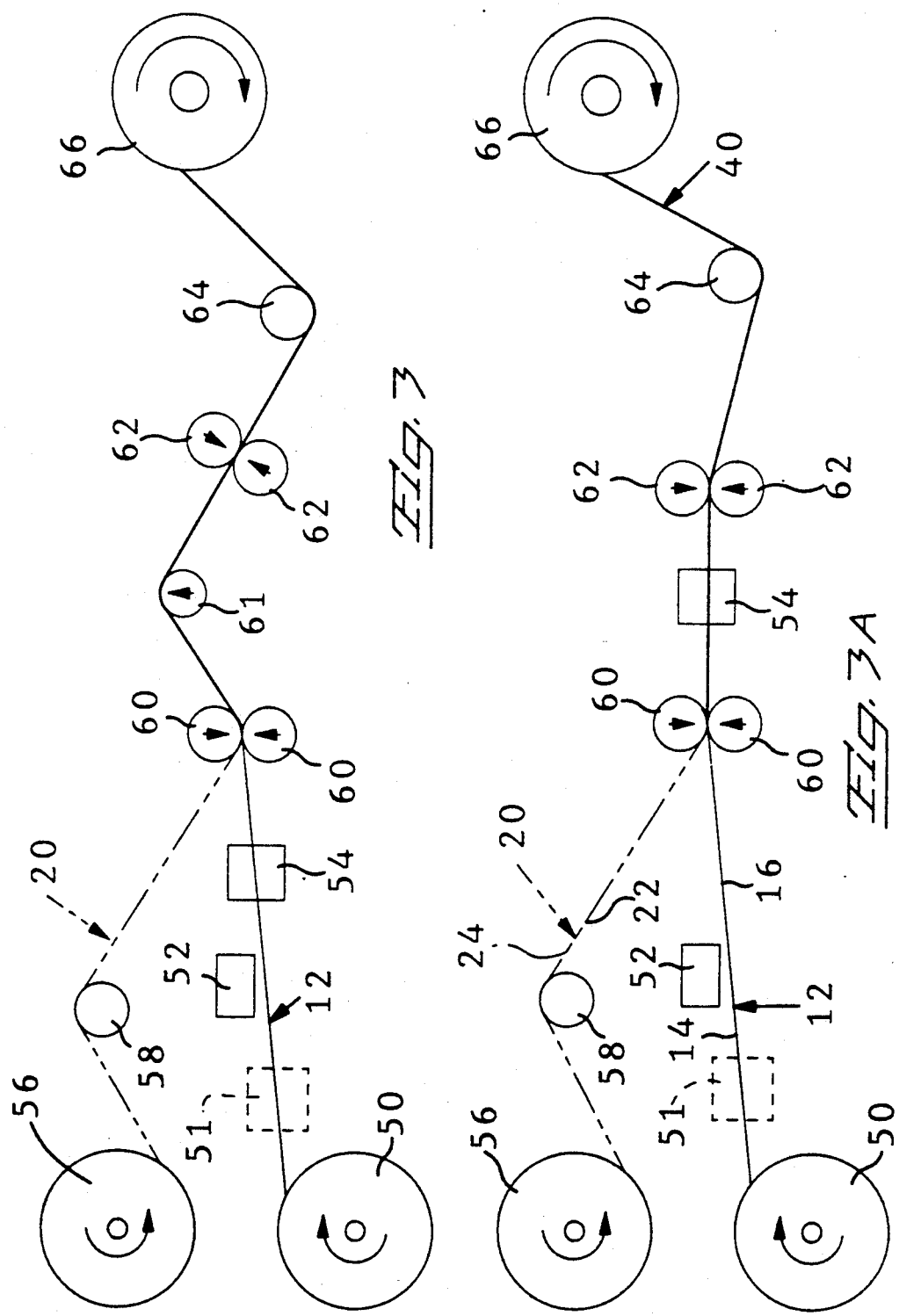

METHOD FOR LAMINATING POLYMER FILMS

This application is a continuation of application Ser. No. 07/401,578 filed Aug. 24, 1989, now abandoned, in turn, a continuation of application Ser. No. 07/226,179 filed Jul. 29, 1988, now abandoned.

FIELD OF THE INVENTION

This invention relates to laminating layers of polymer films and in particular to laminates that form an assured bond with a further substrate to form a resultant laminated assembly, the bond having sufficient strength to withstand further processing and forming of the resultant assembly.

BACKGROUND OF THE INVENTION

Laminating films are generally made from polyethylene, polypropylene, polyesters, polyimides, polyetherimides, polysulphones and the like. In general these polymer films have surfaces that are chemically inert and non-porous. These surfaces have low surface energies that cause them to be non-receptive to bonding with adhesives, printing inks, coating and the like. Typically the surface of these materials are subjected to a surface treatment to improve their bonding characteristics. One method for achieving a bond between a layer of polymer film and another layer of film, such as an adhesive film, is to form a laminate by using a primer adhesive, which prepares the surface of one of the layers of polymer film for bonding to the other layer of film. This method, however, generally requires the use of an adhesive having volatile organic solvents, which react with the surface of the polymer film to render it more receptive to subsequent bonding. The organic solvents, however, may pose both safety and health risks. It is desirable, therefore, to have a method of laminating films that will eliminate the use of such organic solvents. It is also desirable to have an in-line method for treating the surface of a film shortly before lamination to insure a strong bond.

A number of other methods are known for treating the surfaces of film layers to increase the bonding characteristics. These methods include (1) corona discharge; (2) etching by means of acid or plasma; and (3) flame treatment. Generally the latter two means are reserved for molded parts, while corona treatment is used when bonding sheets or strips of film. The object of the corona treatment is to improve the wetability of surface of the film to improve the ability of the film to bond to adhesives. In bonding two polymer webs it is recognized that both webs should generally be corona treated prior to thermal laminating the layers. A discussion of the surface treatment of polymer films and corona treating in general is found in Chapter 14, "Surface Treatment" pp 241-249 of *Web Processing and Converting Technology and Equipment*, (D. Satas, ed. 1984), Van Nostrand Reinhold Company, New York, N. Y.

Once the adhesive has been bonded to a surface of the polymer film, the laminate is typically bonded to another article. One particular application of a use of a laminate is in manufacturing of preinsulated electrical connectors and in particular preinsulated crimpable connectors. This type of connector has an insulating sheath bonded to a metal ferrule member. Typical connectors of this type are disclosed in U.S. Pat. Nos. 3,320,354 and 3,611,262. Tools such as the devices disclosed in U.S. Pat. No. 3,328,872 have been designed to crimp the connectors of the above patents onto wires. Such connectors have long been used to splice insulated wires particularly wires such as telephone cables.

In forming the insulating sheaths for such connectors, it is necessary to adhere the metal to a polymer film, such as a polyester film. In assembling such connectors the film layer is first laminated to a film of adhesive and then to a strip of metal that has been stamped into a series of connector blanks. The unit comprising the sheath, adhesive and metal is then formed into a U-shaped connector. The insulating sheath must have sufficient flexibility and bond strength to withstand the force exerted in forming the connector without delamination occurring between the adhesive film and the metal or the adhesive film and the outer film layer. In addition, the formed connector should be resistant to environmental changes, such as fluctuations in temperature and humidity, without delamination thereby assuring a long shelf life.

It is desirable, therefore, to have a means for assuring the bond between the outer sheath film and the adhesive film and the bond between the adhesive film and the metal that are capable of withstanding such forming forces as well as subsequent crimping forces, which may be in excess of 500 kilogram/square centimeter (7000 pounds/square inch).

In addition it is desirable to have a method for assuring a bond that does not require the use of volatile organic solvents.

The present invention is directed to a method for laminating film layers without the need of adhesive primer materials and to a method for bonding that assures a secure bond even when the materials are subjected to high tensile forces.

SUMMARY OF THE INVENTION

It is an object of the invention to provide a method for laminating a layer of dielectric film to a layer of adhesive film without the need for a primer adhesive.

It is a further object of the invention to provide a method for assuring a secure bond in a laminate that will withstand high tensile forces.

It is yet another object of the invention to provide an in-line method for treating the films to ensure bondability.

It is a further object of the invention to provide a cost effective method for achieving a laminate having an assured bond between the layers.

It is an additional object to provide a method for laminating continuous strips of the film.

The present invention is directed to making an intermediate laminated product comprising at least two layers of film, each film having inner and outer major surfaces, one layer of film having a lower melting point than the other. The method comprises treating the inner surface of at least one layer of film to a high voltage electrical discharge to form a treated inner surface, heating the strip of treated film; aligning the inner surface of the treated film with the inner surface of the other film layer in an opposed facing relationship; applying pressure to urge these films relatively together and heating the pressed-together films to a temperature greater than the melting point of the lower melting film, whereby said layers of film adheres to one another to form said intermediate laminated assembly and said intermediate assembly is bondable to another substrate to form a resultant laminated assembly, the resultant assembly being formable to include formations extending outwardly of the plane of the resultant laminated assembly, and an article so formed therefrom remains assuredly bonded to achieve a bond between the films such that they act as an integral unit.

The present invention is directed more particularly to a method for laminating an adhesive film to a dielectric film comprising the steps of: selecting an adhesive film with a melting point $T_1$, the adhesive film having inner and outer major surfaces; selecting a dielectric film with a melting point $T_2$, where $T_2 > T_1$, the dielectric film having inner and outer major surfaces; subjecting the inner surface of the dielectric film to a high voltage electric discharge to form a treated inner surface; heating the dielectric film having the treated inner surface to a temperature greater than $T_1$; aligning the inner adhesive surface and the inner treated dielectric surface in opposed facing relationship; applying pressure to urge the films relatively together; and heating said pressed together films to a temperature greater than $T_1$; whereby the adhesive film adheres to the dielectric film to form the intermediate laminated assembly and the intermediate assembly is bondable to another substrate to form a resultant laminated assembly, the resultant assembly being formable to include formations extending outwardly of the plane of the resultant laminated assembly, and an article so formed therefrom remains assuredly bonded.

In the preferred embodiment, the dielectric film is a polyester film. Other suitable films may be bonded in accordance with the invention, such as those made from polyimides, polyetherimides, polysulphones and the like.

In the preferred method the inner surfaces of both of the film layers are subjected to the high voltage electric discharge known as corona discharge. It has been found that by preheating the layer of film having the higher melting point $T_2$ to a temperature greater than $T_1$, the melting point of the other layer of film, immediately prior to bringing the two film layers together and applying heat and pressure to the aligned layers to urge the layers together, gives an intermediate or adhesive laminate or composite film that is bondable to a metal substrate to form a resultant laminate having a bond that is surprisingly and unexpectedly superior to similar bonds formed in accordance with the prior art. Connectors made from the resultant laminate of the present invention exhibit markedly superior performance in environmental tests when compared with connectors made in accordance with the prior art. The performance of the connectors increased by greater than an order of magnitude.

In accordance with the present invention a method for laminating two layers of film is provided that achieves a secured bond between the layers such that the intermediate laminated product may be subsequently adhered to a further substrate, such as a strip of metal, to form a resultant laminated assembly that may be subjected to forming forces without delamination.

The invention itself, together with further objects and the intended advantages, will be best understood by reference to the following detailed description, taken in conjunction with the accompanying drawings.

BRIEF DESCRIPTION OF THE DRAWINGS

FIG. 3 is a schematic drawing of the process for forming the intermediate laminated assembly of the invention.

FIG. 3A is a schematic drawing of an alternative embodiment of the process for forming the intermediate laminated assembly of the invention.

DETAILED DESCRIPTION OF THE DRAWINGS

Figure 1:
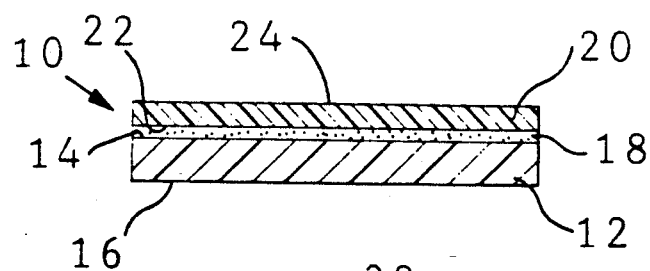
FIG. 1 is a diagrammatic cross sectional representation of the intermediate laminated assembly of the prior art.

Referring now to FIG. 1, the prior art intermediate laminated assembly 10 is comprised of a first dielectric layer 12 having inner and outer major surfaces 14, 16 respectively; second dielectric layer 20 having inner and outer major surfaces 22, 24 respectively adhered to each other by means of adhesive primer layer 18, which is disposed between inner surfaces 14, 22 of first and second dielectric layers 12 and 20 respectively. The second or inner layer 20 is a hot melt adhesive film that is compatible with the first layer and will adhere to the other material that will be used in making the resultant assembly.

Figure 1A:
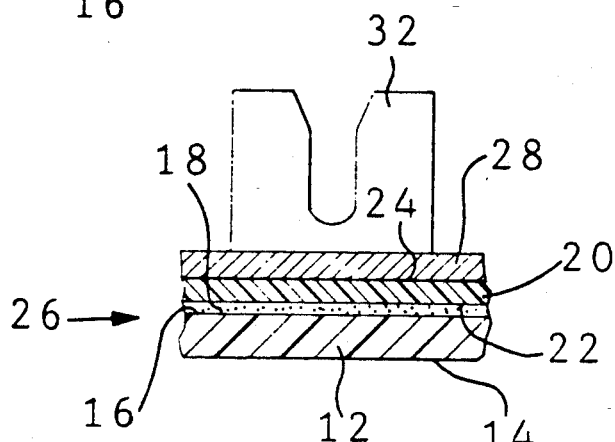
FIG. 1A is a diagrammatic cross sectional representation of the prior art laminated assembly of FIG. 1 adhered to a metal strip.
Figure 2:
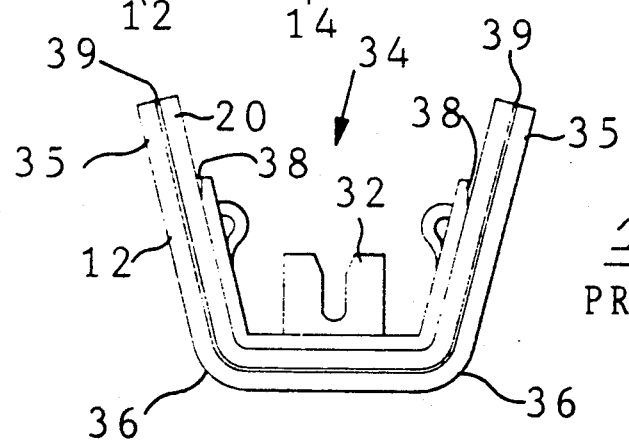
FIG. 2 is an end view of the formed preinsulated ferrule-type electrical connector of the prior art using the laminated assembly of FIG. 1.

FIG. 1A is a diagrammatic cross sectional representation of the prior art intermediate laminated assembly of FIG. 1 adhered to a metal substrate 28 to form the resultant laminated assembly 26 of the prior art. When forming electrical connectors of the type shown in FIG. 2, metal substrate 28 is generally tin plated phosphor bronze or tin plated brass, but other metals suitable for electrical connectors may be used. The particular materials used for the film layers and the metal or other substrate must be compatible with each other. As can be seen from FIG. 2, edges 35 of intermediate assembly 10 extend beyond the edges of the metal substrate 28. FIG. 2 shows an end view of a prior art ferrule-type connector 34 formed from resultant laminated assembly 26 of FIG. 1A. In forming the structure of FIG. 2, the metal and laminate layers are typically subjected to forming forces of 1000 kilogram/square centimeter (15,000 pounds/square inch).

Prior art connector 34, shown in FIG. 2, is in the general shape of a "U". The first or sheath layer 12 is subjected to a great degree of stress owing to an amount of stretching necessary to form the bends at 36. The stresses created at 36 tend to cause delamination of intermediate assembly 10 at 38. Tests have shown that the outer layer is stretched to or beyond its elastic limit at the bend 36. This stretching also puts a great deal of stress on the bond between layers 12 and 20 and they too may delaminate, usually at 39.

Figure 4:
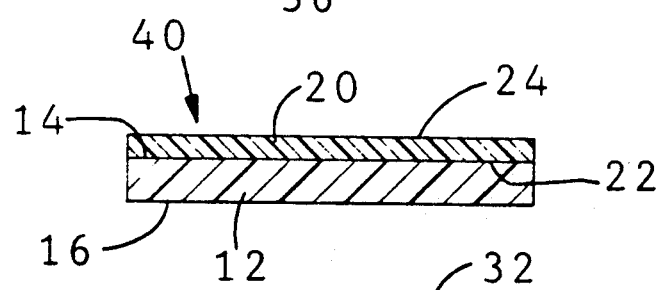
FIG. 4 is a diagrammatic cross sectional representation of the intermediate laminated assembly made in accordance with the invention.
Figure 4A:
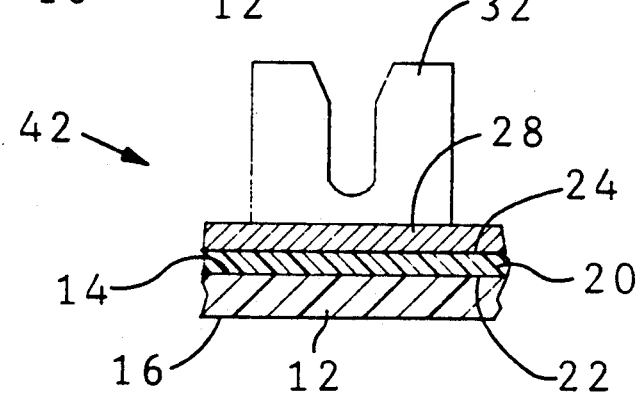
FIG. 4A is a diagrammatic cross sectional representation of the laminated assembly of FIG. 4 adhered to a layer of metal.

In accordance with the present invention, intermediate laminated assembly or composite film 40, as best seen in FIGS. 4, and 4A, uses the same type of film layers 12 and 20 as the prior art. The same reference numerals, therefore, will be used throughout the description to refer to the same parts. Intermediate laminated assembly 40 is comprised of first layer 12 having inner and outer surfaces 14, 16 respectively and second film layer 20 having inner and outer layer surfaces 22, 24. Intermediate assembly 40 of the present invention however, requires no primer adhesive such as that of the prior art.

In the preferred embodiment of the invention, first or sheath layer 12 is a polyester, such as MYLAR 500EL available from E. I. Du Pont de Nemours and Co., Inc, Wilmington, DE; MELINEX 442, available from ICI Americas Inc., Wilmington, DE; HOSTAPHAN 3900, available from American Hoecst Corp., Somerville, N. J.; and LUMIRROR, Grade E, available from Toray Marketing and Sales (America Co.), New York, N. Y. The melting point of polyesters is in excess of 200° C. (392° F.). The adhesive film in the preferred embodiment is a corona treated polyethylene acrylic acid copolymer, available from Dow Chemical Co. under the trade name DAF Dow Adhesive Film 899. The melting point of the polyethylene acrylic acid copolymer film is in the range of 98° C.-105° C. (208° F.-221° F.). In the presently preferred embodiment, the polyester sheath layer is 125 microns (0.005 inches) thick, and the adhesive film is 37 microns (0.0015) inches thick. This produces an intermediate assembly having a thickness of about 162 microns (0.0065 inches), which is compatible with present manufacturing equipment and application tooling. Other thicknesses of films may be used, depending upon the article being made from the resultant laminated assembly.

Figure 5:
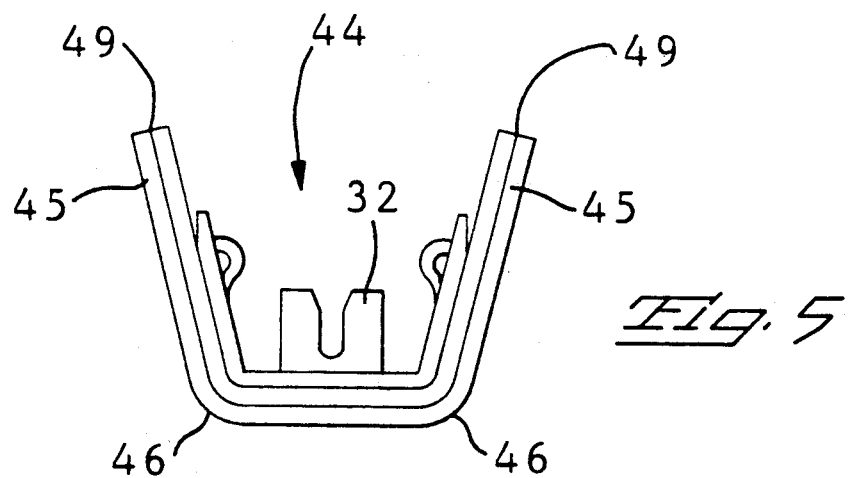
FIG. 5 is an end view of a preinsulated crimpable ferrule-type electrical connector using the laminated assembly of the present invention.
Figure 6:
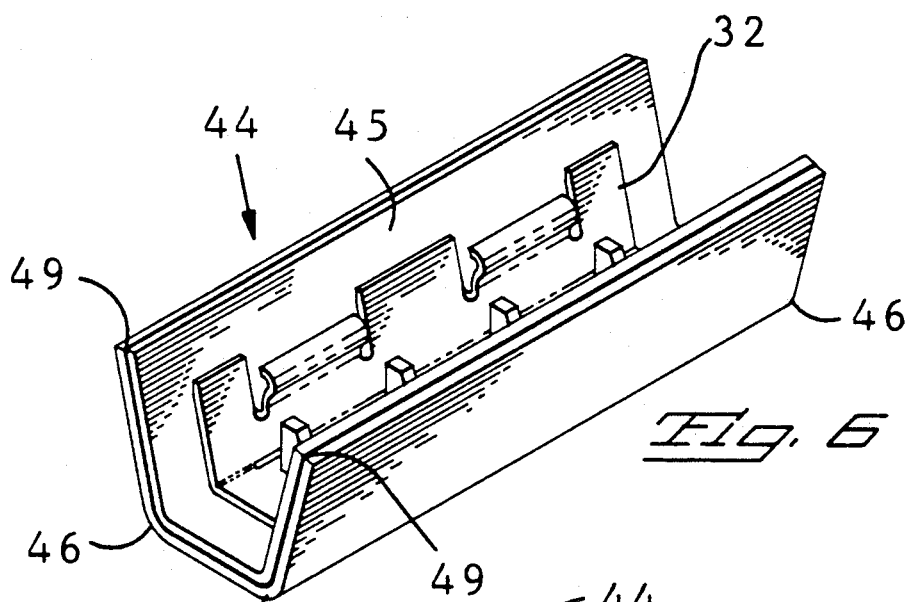
FIG. 6 is a perspective view of the connector of FIG. 5.
Figure 7:
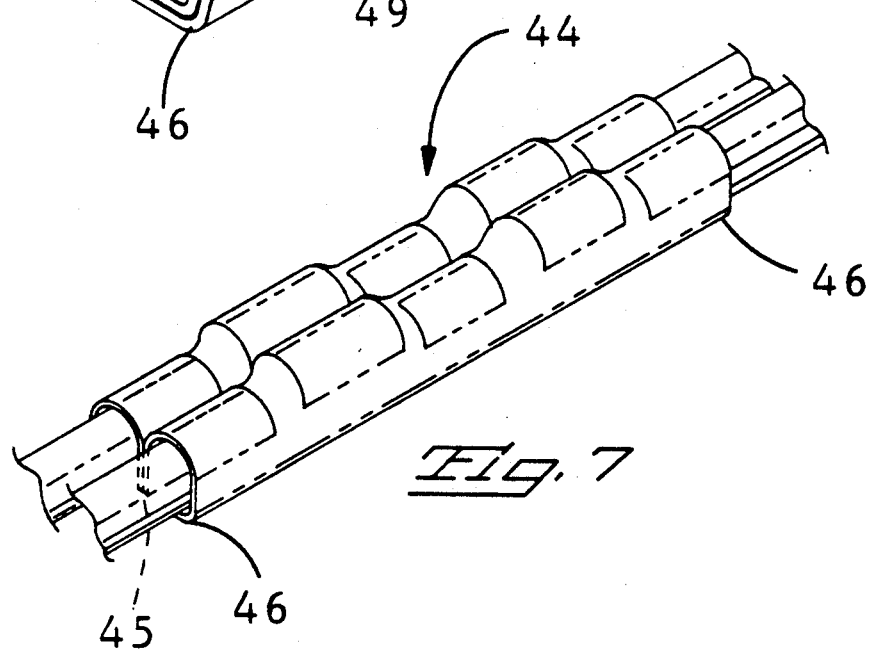
FIG. 7 is a perspective view of the crimped connector of FIG. 6.

FIG. 4A is a diagrammatic cross sectional representation of composite film or intermediate laminated assembly 40 adhered to a metal substrate 28 to form the resultant laminated assembly 42 of the present invention. As can be seen from FIG. 5, edges 45 of intermediate assembly 40 extends beyond the edges of the metal substrate 28. FIG. 5 shows an end view and FIG. 6 is a perspective view of a ferrule-type connector 44 formed from laminated assembly 42 of FIG. 4A. Connector 44, shown in FIGS. 5 and 6 is in the general shape of a "U". It is to be understood that this connector shape is only representative of the types of connectors that may be used in accordance with the present invention. FIG. 7 shows connector 44 after it has been crimped to wires. As can be seen from FIG. 7, the edges 45 of intermediate assembly 40, are bent inwardly and follow the ferrule 32 as connector 44 is crimped. It is essential, therefore, that the sheath layer 12, and adhesive layer 20 remain bonded to the surface of ferrule 32 so that proper crimping may occur. The present invention provides an assured bond between intermediate assembly 40 and metal 28 that is unexpectedly and surprisingly more resistant to delamination than the bond attainable in the prior art. Connectors made from the resultant laminate of the present invention exhibit markedly superior performance in environmental tests when compared with connectors made in accordance with the prior art. Samples of connectors made in accordance with the present invention remain laminated even after immersion in boiling water for 10 seconds. The performance of the connectors increased by greater than an order of magnitude. Prior connectors delaminated essentially immediately upon being dropped into the boiling water.

It is particularly essential that the outer dielectric and the inner adhesive layer of the laminate remain bonded together when used in making connectors of the type shown in FIG. 5 and 6. The "U"ing, or forming operation produces considerable stress on the bond between the layers of the laminate. The present invention provides a bond that will remain secure despite the force applied to it in such a forming operation. Owing to the absence of the adhesive primer, the outer layer 12 is bent at even a sharper angle at 46 in the present invention than it is at 36 in the prior art. Despite this sharper angle, the present invention exhibits unexpected and surprising results in that the residual stress is lower and the bond is more secure. It is thought that the preheating step may relieve some internal stress within the sheath layer, thus giving an intermediate assembly that exerts less force at 46 against the adhesive bond between metal 28 and adhesive layer 20 than the force exerted at 36 in prior art connector 34 of FIG. 2.

FIG. 3 illustrates schematically the method used for forming intermediate laminated assembly 40 of the present invention. A strip of a first layer of film 12 from reel 50 and a strip of adhesive film 20 from reel 56 are passed through a nip roll laminator illustrated by nip rolls 60, 62 to form intermediate assembly 40, which is then wound on reel 66. The tension of strips 12 and 20 as they exit their respective reels 50, 56 and the tension of the strip of intermediate assembly 40 as it enters reel 66 are adjusted, as known in the art, to prevent stretching and uneven rolling of the respective strips. In accordance with the invention, inner surface 14 of layer 12 is subjected to a high voltage electric discharge as it passes a corona discharge system 52. The treated strip is then preheated in oven 54 to a temperature that is greater than the melting point of the adhesive layer 20. The inner surface 14 of the preheated and treated film layer 12 is then aligned with the inner surface 22 of adhesive layer 20 in opposed facing relationship and are sequentially passed between nip rolls 60, 62 to form intermediate laminated assembly 40. Assembly 40 is then cooled by roll 64, prior to being wound on reel 66. This cooling prevents "blocking", which is the term used to describe the problem of successive layers of strip adhering to each other as they are wound on a reel.

In the presently preferred process for the materials described above, the polyester layer 12 is subjected to a corona treatment sufficient to raise the surface energy of the film to about 60 ergs per square centimeter. Strip 12 is preheated by passing the strip through an IR tunnel oven having a temperature of approximately 620° C. (1150° F.). Strip 12 is moved through the oven at a rate sufficient to raise the temperature of the strip to about 177° C.-182° C. (350° F.-360° F.). To assure a good bond at the interface between the layers of film, the temperature of the sheath layer should be sufficient to produce a temperature between the sheath and adhesive layer or glue line temperature sufficient to melt the adhesive. For the lamination of polyester and polyethylene acrylic acid copolymer films, the optimum glue line temperature should be in the range of 143° C.-188° C. (290° F.-370° F.), and preferably in the range 154° C.-177° C. (310° F.-350° F.). For ease of alignment of strips 12 and 20, the strips are first be passed through a set of unheated nip rolls 60 under a pressure of about 3.2 kilogram/square centimeter (45 pounds/square inch), reheated by passing the partially bonded strips over roll 61. which has been heated to about 177° C. (350° F.). prior to being passed through heated nip rolls 62. At least one of nip rolls 62 is heated to a temperature of about 177° C. (350° F.), which is approximately the temperature of the film layers. Nip rolls 62 exert a pressure of about 3.2 kilogram/square centimeter (45 pounds/square inch) against the two layers causing them to be bonded together. Under highly humid conditions, if necessary, the polyester film 12 may be passed through a drying oven 51 to remove any excess moisture prior to being subjected to the corona treatment.

FIG. 3A illustrates schematically an alternative embodiment of the method used for forming intermediate laminated assembly 40 of the present invention. In this process, the IR tunnel oven is placed between unheated nip rolls 60 and heated rolls 62. The partially laminated intermediate assembly 40 is heated as a unit prior to being passed through heated rolls 62. In both embodiments, an IR tunnel oven is preferred because the film is heated essentially more uniformly and through the thickness of the film layer or layers, rather than just on the surface of the film. This uniform heating and relatively rapid heating of the film produces a quality product and allows the laminating line to be run at a faster speed than is possible with other methods of heating.

It is preferable that the corona treatment be on-line and applied to the film shortly before lamination occurs. Generally the corona treatment increases the wetability of the surface and improves the surface ability to bond to adhesives. Since the adhesive of the present invention is a solid film, it is important that the maximum effect of the corona treatment be available on the surface prior to lamination. Generally thermal bond such as made by thermal laminator such as the nip rolls require that both polymer webs be treated to the corona discharge. The Dow film used in the present invention is corona treated by the manufacturer. It is to be understood that additional corona treatment may be provided on-line as well. The level of the corona treatment required depends upon the type of material used. When laminating polyester with the polyethylene acrylic acid copolymer, a corona treatment for the polyester that produces a surface energy in the range of 30-60 ergs per square centimeter has produced satisfactory results. The degree of corona treatment will vary with a change in materials used for the adhesive film and/or the sheath layer.

The preheating treatment of the polyester sheath layer is preferably done with an IR heater, which rapidly brings the temperature of the film to 177° C.-182° C. (350° F.-360° F.), thus enabling the line to be run at a faster speed than is possible with a heater that takes a longer period of time to heat the polyester film to the desired temperature.

It is to be understood that the amount of corona treatment, the temperature to which the first layer is heated, the temperature and pressure of the nip rolls, etc may be varied depending upon the materials used for the first and second layers of the intermediate strip, and/or depending upon the speed at which the assembly line is operated. As the speed of the line is varied, the temperatures of the heated nip rolls and the oven should be varied so as to maintain essentially constant film temperatures. The processing window is primarily defined by the parameters that allow a glue line temperature sufficient to melt the adhesive. For the lamination of polyester and polyethylene acrylic acid copolymer films, the optimum glue line temperature should be in the range of 143° C.-188° C. (290° F.-370° F.), and preferably in the range 154° C.-177° C. (310° F.-350° F.).

Table 1 (below) compares the results of environmental tests performed on production run samples of electrical connectors made with the intermediate laminated assembly including the adhesive primer in accordance with the prior art (Group A); connectors made with an intermediate assembly wherein the sheath layer was subjected to corona surface treatment without preheating prior to bonding with the adhesive film (Group B); and connectors made in accordance with the invention, which included corona treatment plus preheating of the sheath layer with an IR heater (Group C).

The production run connector samples were formed into the general shape of the connector of FIG. 6. A connector sample was considered to have passed the test if the layers of the intermediate laminate remained adhered to each other and to the metal member after testing was completed. A connector was considered to have failed the test if any delamination occurred. Each test was performed on new groups of samples.

TABLE 1

| | The following tests were performed: | | | | |
|---|---|---|---|---|---|
| 1. | Immersion in boiling water for 5 seconds. | | | | |
| 2. | Immersion in boiling water for 10 seconds. | | | | |
| 3. | Dry heat at 175° F. for 2 hours. | | | | |
| 4. | Dry heat at 180° F. for 2 hours. | | | | |
| 5. | Dry heat at 185° F. for 30 minutes. | | | | |
| | ENVIRONMENTAL TESTS[1] | | | | |
| SAMPLE | TEST | | | | |
| GROUP | 1 | 2 | 3 | 4 | 5 |
| A | F | F | P | F | F |
| B | F | F | P | P | F |
| C | P | P | P | P | P |

[1]F = fail; P = pass.

As can be seen from the results of the test, the connectors made in accordance with the invention have a bond at the interface between polymer and adhesive layers of the composite film that is surprisingly and unexpectedly superior to similar bonds formed in accordance with the prior art. Connectors made from the resultant laminate of the present invention exhibit markedly superior performance in environmental tests when compared with connectors made in accordance with the prior art.

Other suitable polymer films may be bonded in accordance with the invention, such as films made from polyimides, polyetherimides, polysulphones and the like. Samples of connectors have been made with intermediate assemblies made from the above materials wherein the polymer films were subjected to corona treatment and preheated prior to lamination with the polyethylene acrylic acid copolymer film. Upon visual inspection, no delamination was seen in these samples.

The invention is described by way of example only. It is to be understood that the electrical connectors used with the laminate of present invention are representative samples only. It is to be further understood that the form and shape of the connectors with which this laminate may be used are numerous. The connectors 40 are only exemplary of the many types of preinsulated crimpable ferrule-type connectors available.

What is claimed is:

1. A method for making a laminated assembly suitable for being substantially shaped and formed into an insulated electrical terminal having a U-shaped channel portion, the laminated assembly comprising an adhesive laminated subassembly having a major surface thereof bonded to a metal substrate without additional adhesive means, the adhesive laminated subassembly comprising an adhesive film laminated to a dielectric polymer film along a bonded interface therebetween, the method comprising the steps of:

- selecting an adhesive film with a melting point $T_1$, and bondable to other surfaces without additional adhesive means, said adhesive film having inner and outer major adhesive surfaces;
- selecting a polymer film with a melting point $T_2$, where $T_2 > T_1$, said polymer film having inner and outer major surfaces;
- subjecting said inner surface of said polymer film to a high voltage electric discharge to form a treated inner surface;
- heating said polymer film having said treated inner surface to a temperature greater than $T_2$,
- aligning said adhesive surface and said inner treated polymer surface in opposed facing relationship, and
- applying pressure to urge said films relatively together; and then
- heating said pressed together films to a temperature greater than $T_1$, said adhesive film thereby adhering to said polymer film along a bonded interface to form said adhesive laminated subassembly, said adhesive film remaining adhesive along its outer major surface for bonding to a metal substrate without additional adhesive means and the bonded interface between said adhesive and said polymer films having enhanced bond strength; and
- bonding a metal substrate along said outer major surface of said adhesive film to define a subsequent bonded interface thereby forming said laminated assembly, whereby
- said laminated assembly is formable into said electrical terminal wherein sidewalls of said U-shaped channel portion extend outwardly at sharp bends from the plane of the laminated assembly, thus stressing both the bonded and subsequent bonded interfaces, the polymer film of the article so shaped and formed from the laminated assembly has enhanced resistance to delamination from said adhesive film, and the polymer film remains assuredly secured to the outer surfaces of the formed electrical terminal.

2. The method for making laminated assembly as defined in claim 1 wherein said polymer film is a polyester film.

3. The method for making laminated assembly as defined in claim 1 wherein said polymer film is selected from the group of films consisting of polyester, polyimide, polyetherimide, and polysulphone films.

4. The method for making laminated assembly as defined in claim 1 wherein said adhesive film is a polyethylene acrylic acid copolymer.

5. The method for making laminated assembly as defined in claim 1 wherein said high voltage electric discharge produces a surface energy in the range of 30-60 ergs per square centimeter on said inner surface of said polymer film.

6. The method for making laminated assembly as defined in claim 1 wherein said polymer film is heated by an infrared heating means.

7. The method for making laminated assembly as defined in claim 1 wherein said pressed together films are heated by an infrared heating means.

8. The method for making laminated assembly as defined in claim 1 further including the step of preheating said polymer film to remove excess moisture prior to subjecting said inner surface of said polymer film to a high voltage electric discharge.

9. A method for making a laminated assembly suitable for being substantially shaped and formed into a resultant insulated article having a U-shaped channel portion, the laminated assembly comprising an adhesive laminated subassembly having a major surface thereof bonded to a metal substrate without additional adhesive means, the adhesive laminated subassembly comprising an adhesive film laminated to a dielectric polyester film along a bonded interface therebetween, the method comprising the steps of:

- selecting an adhesive film with a melting point $T_1$, and bondable to other surfaces without additional adhesive means said adhesive film having inner and outer major adhesive surfaces;
- selecting a polymer film with a melting point $T_2$, where $T_2 > T_1$, said polymer film having inner and outer major surfaces;
- subjecting said inner surface of said polyester film to a high voltage electric discharge to form a treated inner surface;
- heating said polymer film having said treated inner surface to a temperature greater than $T_1$,
- aligning said inner adhesive surface and said inner treated polymer surface in opposed facing relationship, and
- applying pressure to urge said films relatively together; and then
- heating said pressed together films to a temperature greater than $T_1$, said adhesive film thereby adhering to said polyester film along a bonded interface to form said adhesive laminated subassembly, said adhesive film remains adhesive along its outer major surface for boding to a metal substrate without additional adhesive means and the bonded interface between said adhesive and said polymer films having enhanced bond strength;
- selecting a conductive metal substrate; and
- bonding a major surface of said metal substrate along said outer major surface of said adhesive film to define a subsequent bonded interface thereby forming said laminated assembly, whereby
- said laminated assembly is formable into a resultant article having a U-shaped channel potion extend and including laminated portions extending outwardly at sharp bends from the plane of the laminated assembly, thus stressing both the bonded and subsequent bonded interfaces, both of which assuredly resist delamination when an article is shaped and formed from the laminated assembly, and the polymer film of said insulative covering has enhanced resistance to delamination from said adhesive film and remains assuredly intimately secured to said formed article.

10. The method for making laminated assembly as defined in claim 9 wherein said adhesive film is a polyethylene acrylic acid copolymer.

11. The method for making laminated assembly as defined in claim 9 wherein said high voltage electric discharge produces a surface energy in the range of 30-60 ergs per square centimeter on said inner surface of said polymer film.

12. The method for making laminated assembly as defined in claim 9 further including the step of preheating said polyester film to remove excess moisture prior to subjecting said inner surface of said polyester film to a high voltage electric discharge.

* * * * *

UNITED STATES PATENT AND TRADEMARK OFFICE
CERTIFICATE OF CORRECTION

PATENT NO. : 5,110,387

DATED : May 5, 1992

INVENTOR(S) : JOHN F. JASINSKI, ROBERT P. MCCORMICK, RICKY C. MELLINGER, JAMES K. DRAPER, NAVIN N. VYAS

It is certified that error appears in the above-identified patent and that said Letters Patent is hereby corrected as shown below:

In claim 1, column 9, line 19, change "$T_2$" to "$T_1$";

In claims 2 through 8, column 9, lines 47, 50, 54, 56, 61, 64, and 67, insert -- a -- between "making" and "laminated";

In claim 9, column 10, line 35, replace "remains" with -- remaining --;

In claim 9, column 10, line 36, replace "boding" with -- bonding --; and

In claims 10 through 12, column 10, lines 55, 58, and 63, insert -- a -- between "making" and "laminated".

Signed and Sealed this

Eleventh Day of August, 1992

Attest:

DOUGLAS B. COMER

Attesting Officer  Acting Commissioner of Patents and Trademarks